United States Patent
Terry

(10) Patent No.: US 7,400,861 B2
(45) Date of Patent: Jul. 15, 2008

(54) POWER CONTROL OF POINT TO MULTIPOINT PHYSICAL CHANNELS

(75) Inventor: Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 413 days.

(21) Appl. No.: 10/632,776

(22) Filed: Aug. 1, 2003

(65) Prior Publication Data

US 2004/0266447 A1    Dec. 30, 2004

Related U.S. Application Data

(60) Provisional application No. 60/400,602, filed on Aug. 1, 2002.

(51) Int. Cl.
*H04B 1/00* (2006.01)

(52) U.S. Cl. .......................................... 455/69; 455/522

(58) Field of Classification Search ................. 455/522, 455/69, 453, 423, 13.4, 463, 450, 511, 103
See application file for complete search history.

(56) References Cited

U.S. PATENT DOCUMENTS

| | | | |
|---|---|---|---|
| 6,006,073 A | 12/1999 | Glauner et al. | |
| 6,408,179 B1 | 6/2002 | Stosz et al. | |
| 6,498,785 B1 | 12/2002 | Derryberry et al. | |
| 6,693,892 B1 | 2/2004 | Rinne et al. | |
| 6,728,226 B1 * | 4/2004 | Naito | 370/328 |
| 6,959,199 B2 | 10/2005 | Ohkubo et al. | |
| 2002/0012321 A1 | 1/2002 | Rune et al. | |
| 2002/0111183 A1 | 8/2002 | Lundby | |
| 2003/0157953 A1 * | 8/2003 | Das et al. | 455/522 |

FOREIGN PATENT DOCUMENTS

| | | |
|---|---|---|
| CN | 1266594 | 9/2000 |
| CN | 1266594 A | 9/2000 |
| CN | 1266594 A | 9/2000 |
| CN | 1352509 | 6/2002 |
| CN | 1352509 A | 6/2002 |
| CN | 1352509 A | 6/2002 |
| EP | 0 999 656 | 5/2000 |
| EP | 1 063 782 | 12/2000 |
| EP | 1 207 711 | 5/2002 |
| EP | 1 531 560 | 5/2005 |
| JP | 2000-138632 | 5/2000 |
| JP | 2002-198903 | 7/2002 |
| KR | 2001-0038996 | 5/2001 |
| WO | 02/47417 | 6/2002 |
| WO | 02/47417 A1 | 6/2002 |
| WO | WO 0247417 A1 | 6/2002 |
| WO | 02/054638 | 7/2002 |
| WO | 02/056505 | 7/2002 |
| WO | 03/005603 | 1/2003 |
| WO | 2004/000139 | 12/2003 |

* cited by examiner

*Primary Examiner*—Tu Nguyen
(74) *Attorney, Agent, or Firm*—Volpe and Koenig, P.C.

(57) ABSTRACT

Data is transmitted over a particular channel from a transmitter to a plurality of receivers. The particular channel is received at the plurality of receivers. Each of the receivers sends power control information to the transmitter based on a measured reception quality and the reception quality requirements of each receiver. The transmitter uses the power control information from each receiver and adjusts a transmission power level of the particular channel so that if any receiver requires an increase in the transmission power level to meet that receiver quality requirement, the transmission power level is increased and if all receivers exceed their quality requirement, the transmission power level is decreased.

28 Claims, 2 Drawing Sheets

POWER CONTROL OF POINT TO MULTIPOINT PHYSICAL CHANNELS

CROSS REFERENCE TO RELATED APPLICATION(S)

This application claims priority from U.S. provisional application No. 60/400,602 which was filed on Aug. 1, 2002, which is incorporated by reference as if fully set forth.

FIELD OF INVENTION

The present invention relates to wireless communications. More specifically, the present invention relates to power control for point to multipoint (PtM) services.

BACKGROUND OF THE INVENTION

There is a growing desire to use point to multi-point services in wireless communication systems. In point to multi-point (PtM) services, one service is sent from a single point, such as a base station, to multiple points, such as multiple wireless transmit/receive units (WTRUs). Examples of point to multi-point services are multimedia broadcasts and multicast services.

In traditional point to point (PtP) services, power control allows for efficient use of radio resources. Power control allows a particular wireless transmit/receive unit (WTRU) to receive the PtP service at a desired quality of service (QoS) and minimize interference to other WTRUs.

In PtP, such as for the third generation partnership project (3GPP), when the WTRU's dedicated downlink physical channel is power controlled, that WTRU typically determines a target signal to interference ratio (SIR) based on the received block error rate (BLER) of the dedicated physical channel. The WTRU estimates the received dedicated physical channel's SIR. One approach to determine the SIR is as the ratio of received signal code power (RSCP) over the interference signal code power When the WTRU determines that the SIR target value is greater than the calculated estimate of the received SIR value, the WTRU signals via the transmit power control (TPC) commands to the base station to increase transmit power of the downlink dedicated channel. When the SIR target value is less then the received SIR calculated estimate, TPC commands are generated to decrease DL transmit power.

One channel currently proposed for potentially supporting PtM services is the forward access channel (FACH). The FACH is a channel broadcast throughout a cell and the FACH is maintained at a power level so that any user in the cell can receive the FACH. As a result, adaptive power control mechanisms are not used for the FACH. One problem with the lack of FACH power control is that a high data rate service sent over the FACH will generate considerable interference. The FACH transmission power level needs to be set at a power level so that a WTRU at the periphery of the cell can receive the high data rate service at an acceptable quality.

Accordingly, it is desirable to have adaptive power control for PtM services.

SUMMARY

Data is transmitted over a particular channel from a transmitter to a plurality of receivers. The particular channel is received at the plurality of receivers. Each of the receivers sends power control information to the transmitter based on a measured reception quality and a reception quality requirements of each receiver. The transmitter uses the power control information from each receiver and adjusts a transmission power level of the particular channel so that if any receiver requires an increase in the transmission power level to meet that receiver quality requirement, the transmission power level is increased and if all receivers exceed their quality requirement, the transmission power level is decreased.

BRIEF DESCRIPTION OF THE DRAWING(S)

DETAILED DESCRIPTION OF THE PREFERRED EMBODIMENT(S)

Figure 1:
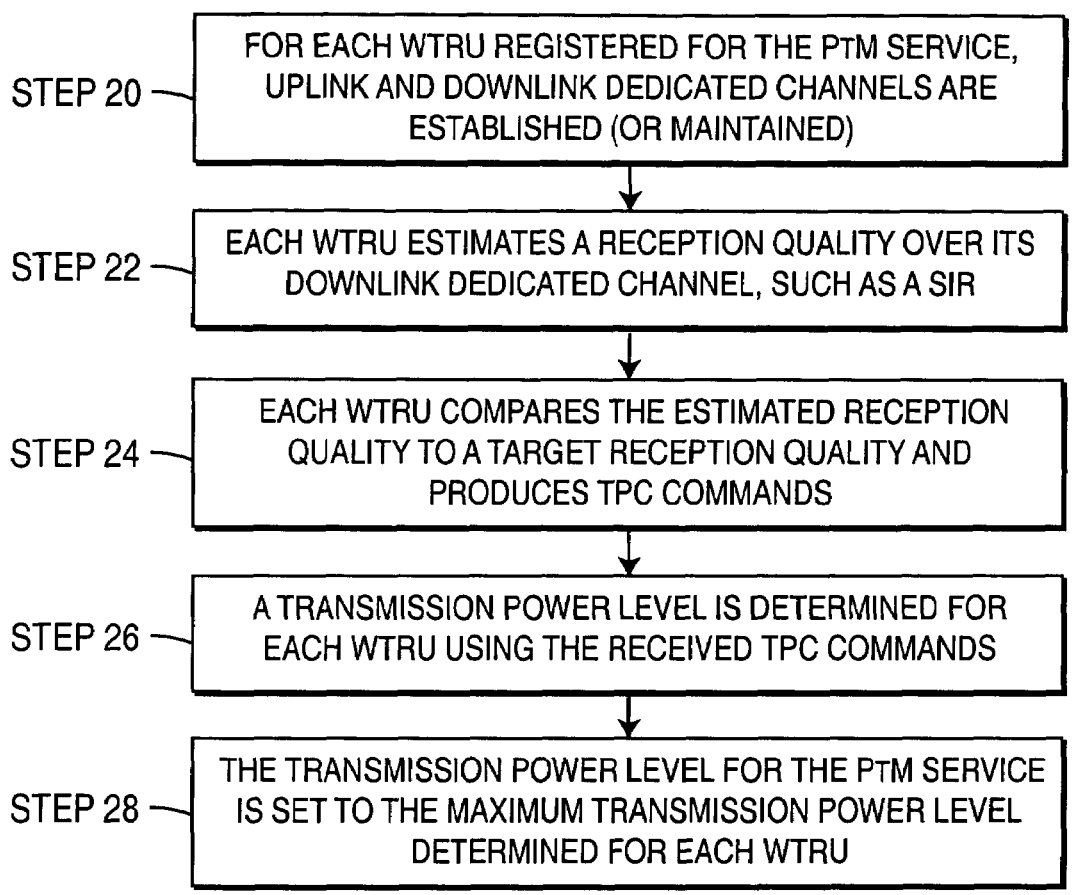
FIG. 1 is a flow chart for power control of a PtM service using associated dedicated channels.

Although the preferred embodiments are described in conjunction with a third generation partnership program (3GPP) wideband code division multiple access (W-CDMA) system, the embodiments are applicable to any wireless system using PtM services.

The present invention will be described with reference to the drawing figures wherein like numerals represent like elements throughout. Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a base station, Node-B, site controller, access point or other interfacing device in a wireless environment.

The present invention is described subsequently for three different general implementations. In a first implementation, each WTRU receiving the PtM service has associated dedicated channels for use in supporting the PtM service. In a second implementation, the WTRUs receiving the PtM service do not have dedicated channels for use in supporting the service. In a third implementation, some of the users have dedicated channels for use in supporting the service and others do not.

Figure 2:
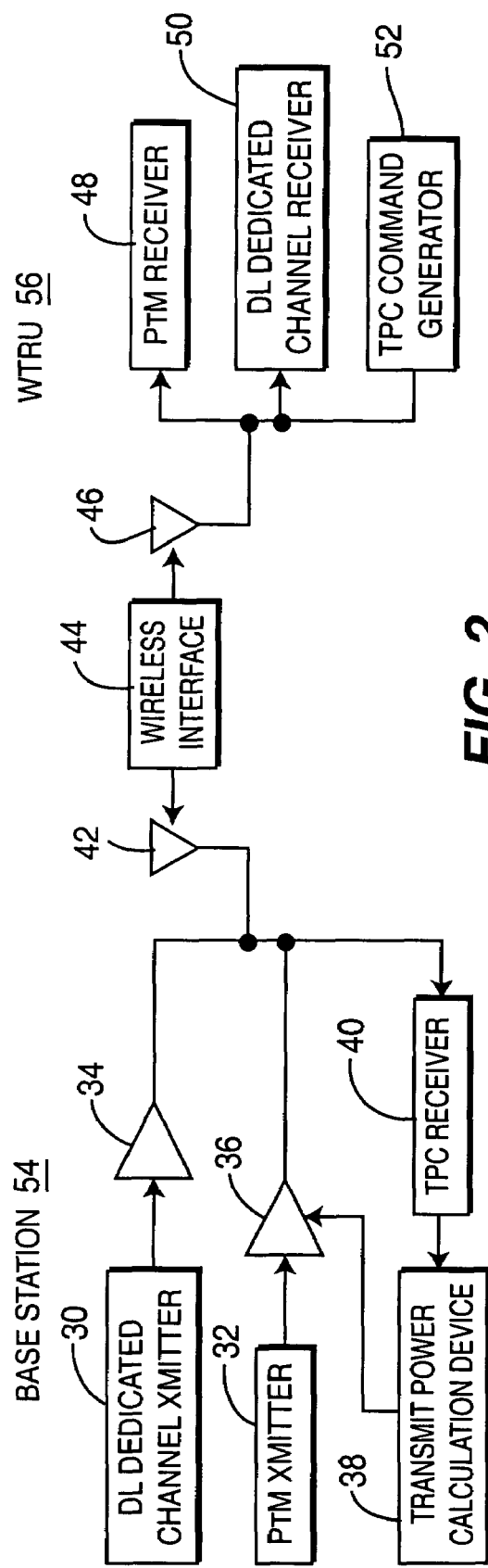
FIG. 2 is a simplified diagram of a base station and a WTRU for power control of a PtM service using associated dedicated channels.

FIG. 1 is a flow chart for adaptive power control for a PtM service when associated dedicated channels are available. FIG. 2 is a simplified block diagram of a base station 54 and WTRU 56 for sending and receiving such a service. The PtM service data may be sent over one of various channels, such as a shared channel, high speed shared channel as proposed for W-CDMA or a common channel. For the PtM service, multiple WTRUs 56 registered for the service receive that service over the PtM channel simultaneously.

For each WTRU 56 that enters the PtM service area and is registered for that service, an uplink and a downlink dedicated physical channels are established, step 20. The dedicated physical channel may be independent or comprised of separate dedicated physical channels for control and data, or just physical control channels.

As shown in FIG. 2 for the downlink (DL) dedicated channel associated with the PtM channel, a DL dedicated channel transmitter 30 produces the channel. An amplifier adjusts the transmission power level of the DL dedicated channel and an antenna 42 or antenna array radiates the DL dedicated channel through the wireless interface 44. At the WTRU 56, a DL dedicated channel receiver 50 coupled to the WTRU antenna 46 and a PTM receiver 48, receives the channel.

Each WTRU 56 estimates a reception quality of the DL dedicated channel, such as a received signal to interference ratio (SIR), step 22. The SIR may be measured using the received signal code power (RSCP) and interference signal code power (ISCP) associated with the DL dedicated physical channels. The estimated reception quality is compared 24 with a target reception quality, such as a target SIR. Based on the comparison, transmit power control (TPC) commands are generated by a TPC command generator 52. The TPC commands are sent to the base station 54, such as using the uplink dedicated channel or as a layer 3 message on a common uplink channel.

A TPC receiver 40 at the base station 54 receives the commands. The TPC commands are used to adjust the transmit power of the DL dedicated channel to achieve the target reception levels, such as target SIR and block error rate (BLER) requirements, for the quality of service (QoS) desired. The power amplifier 34 of the DL dedicated channel is changed accordingly.

For each power controlled PtM physical channel or set of physical channels, the base station equipment maintains a database of which specific WTRUs 56 receive which particular PtM channels. The group of WTRUs 56 associated with each PtM channel is referred to as a PtM Group (PtM-G). A WTRU 56 can be member of more than one PtM-G.

The transmit power of each WTRU's DL dedicated channel or set of dedicated channels is adjusted to the minimum required power necessary to achieve the respective QoS requirement for that WTRU 56. Preferably, for each WTRU 56, the transmit power of the PtM physical channel or set of physical channels is derived from the current transmit powers of the associated DL dedicated channels within the PtM-G, step 26. One approach to determine the required PtM channel power for a WTRU 56 of the PtM-G is according to Equation 1 or Equation 2.

$$\text{PtM\_TxPwr} = \text{DL\_DchPwr} + \text{PtM\_Power\_Offset} \quad \text{Equation 1}$$

$$\text{PtM\_TxPwr} = \text{DL\_DchPwr} * \text{PtM\_Power\_Ratio} \quad \text{Equation 2}$$

PtM_TxPwr is the desired transmit power of the PtM channel for that WTRU 56. DL_DchPwr is the transmission power of that WTRU's DL dedicated channel or channels, adjusted according to TPC commands and the configured TPC step size. PtM_Power_Offset is an adjustment to correct for differences between the DL dedicated channel and the PtM channel, such as coding rate, QoS, etc. PtM_Power_Ratio is a ratio to correct for differences between the DL dedicated channel and the PtM channel.

The PtM power offset and the PtM power ratio are, preferably, derived using multiple factors as illustrated in Equation 3 for the PtM power offset and Equation 4 for the PtM_Power_Ratio.

$$\text{PtM\_Power\_Offset} = \text{RelDch} + \text{RelTF} + \text{RelQoS} + X \quad \text{Equation 3}$$

$$\text{PtM\_Power\_Ratio} = \text{RelDch} * \text{RelTF} * \text{RelQos} * X \quad \text{Equation 4}$$

RelDch is a factor configured by the operator to correct between the power offset between the dedicated channel and the PtM channel. RelTF is a factor to compensate for the difference in transport data block set size and coding rate between the dedicated and the PtM channel. RelQoS is a factor to compensate between the BLER requirements between the dedicated and the PtM channel. X is a general factor for any other relative transmit power offsets/ratios which may be applied.

The PtM transmit power (PtM_Tx_Pwr_PtM-G) is calculated by determining the maximum WTRU PtM transmit power requirement within the PtM-G per Equation 6.

$$\text{PtM\_Tx\_Pwr\_PtM-G} = \text{MAX}(\text{PtM\_TxPwr}(\text{WTRU})) \quad \text{Equation 6}$$

PtM_Txpwr(WTRU) is the set of determined PtM transmission power levels, PtM_TxPwr, for each user of the group, group G. MAX(PtM_TxPwr(WTRU)) is the maximum PtM transmission power level out of this group. By using the maximum PtM transmission power level required by any WTRU 56 in the group, it ensures that all the other WTRUs 56 in the group (which require less PtM transmit power) will be able to receive the PtM signal, step 28. The PtM transmit power may be recalculated and adjusted on a slot, radio frame, or transmission time interval (TTI) basis, among other time periods, for optimal performance.

A PtM transmitter (Xmitter) 32 produces the PtM channel. A transmit power calculation device 38 adjusts the transmit power of the PtM channel, such as by changing a gain of a power amplifier 36, to the desired transmission power level. The base station's transmission power level is adjusted in accordance with the highest WTRU transmission power requirement. The TPC commands from all the WTRUs 56 in the group are processed to determine the power adjustment. Essentially, to increase the transmission power of the PtM requires only a single WTRU 56 to request an increase in transmission power. For the transmission power to decrease, all the WTRUs 56 in the group need to request a decrease in power.

Equation 7 is one possible equation for determining the power adjustments for the PtM transmission.

$$\text{New\_PtM\_Power\_PtM-G} = \text{Current\_PtM\_Power\_PtM-G} + \text{Ptpc} + \text{Pbal} \quad \text{Equation 7}$$

Current_PtM_Power_PtM-G is the current PtM transmit power. Ptpc is either an increase or decrease by a step size. The Ptpc adjustment is preferably a configured power control step size (0.5, 1, 1.5 or 2 dB), which either increases or decreases the transmission power level based on the received TPC commands. Pbal is an optional correction for balancing towards a common reference power.

Figure 3:
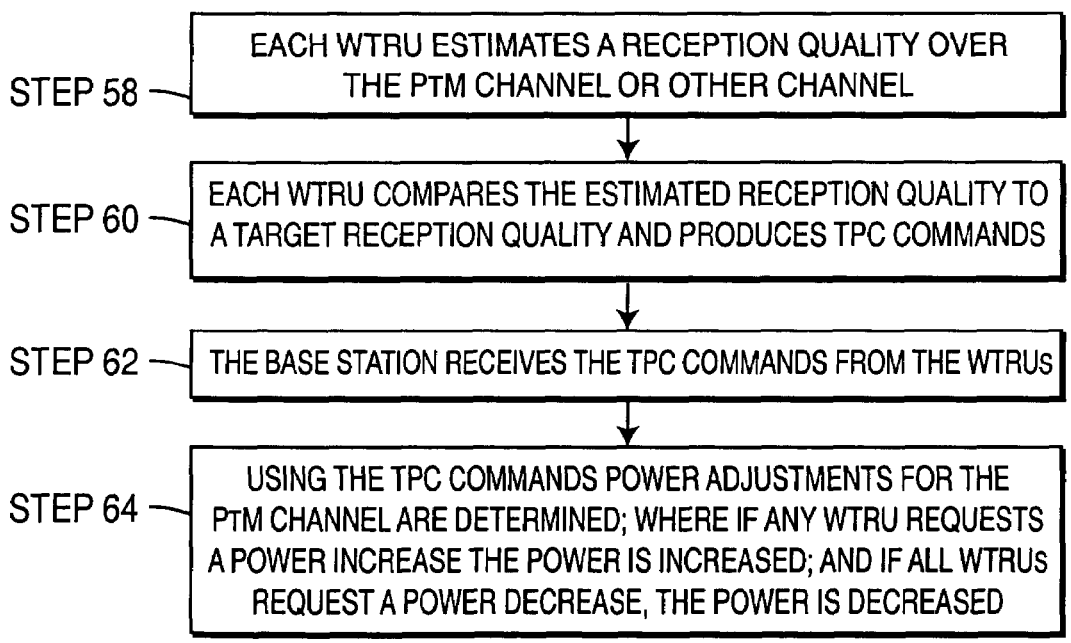
FIG. 3 is a flow chart for power control of a PtM service using associated dedicated channels.
Figure 4:
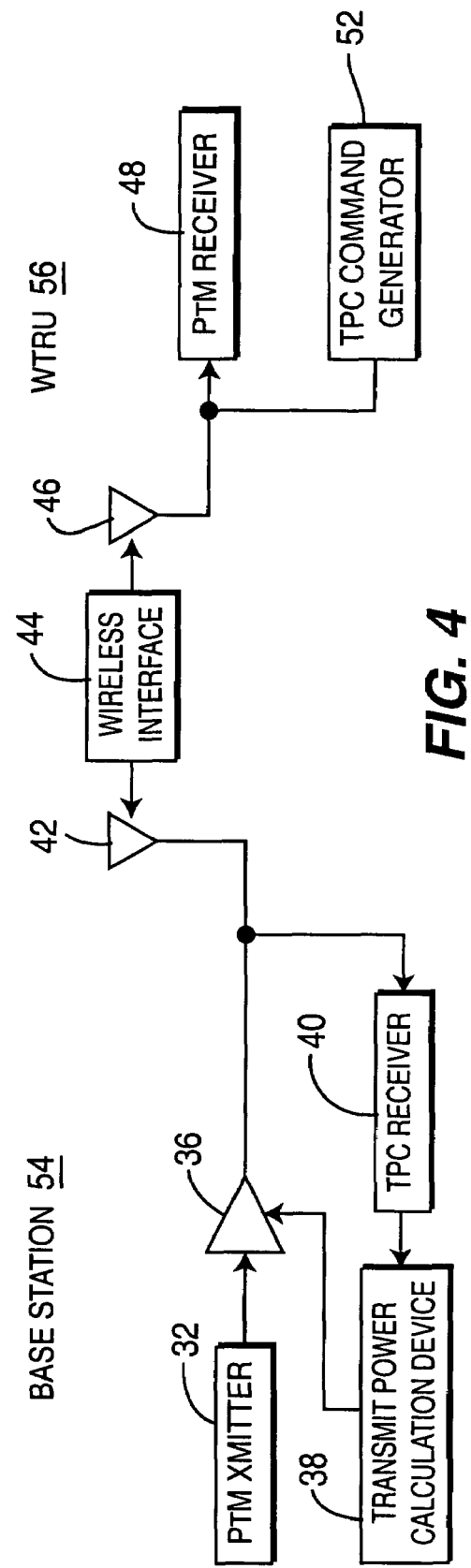
FIG. 4 is a simplified diagram of a base station and a WTRU for power control of a PtM service without using associated dedicated channels.

FIG. 3 is a flow chart for adaptive power control for a PtM service when dedicated channels are not available or are not used to support the PtM service. FIG. 4 is a simplified block diagram of a base station 54 and WTRU 56 for sending and receiving such a service.

A PtM transmitter (Xmitter) produces a PtM channel. The transmission power level of the PtM channel is controlled, such as by an amplifier 36. The initial PtM transmission power level may be a power level preconfigured by an operator that allows for full cell coverage or be based on RSCP and ISCP measurements of WTRUs 56 in the PtM group. The PtM channel is radiated by an antenna 42 or antenna array of the base station 54, though a wireless interface 44. The PtM channel is received by an antenna 46 of each WTRU 56 associated with the PtM service. A PtM receiver recovers data from the PtM channel.

A TPC command generator sends TPC commands to the base station 54 for the PtM. The TPC commands may be based on the SIR of the received PtM channel or another channel received by the WTRU 56, such as a channel received by multiple ones of the WTRUs 56 in the group, steps 58 and 60. The SIR may be derived using the RSCP and ISCP values, pathloss and/or BLER of the measured channel.

One preferred technique for getting these measurements is to use physical control signaling. The measurements, such as RSCP, ISCP and/or pathloss, are signaled directly in physical control signaling or within L2 header information of uplink common channel transmissions. This procedure is similar to the procedure that the initial power of the PtM channel is set. The measurements updates would, preferably, be provided on a "best effort" basis, depending on the availability of the uplink channels to the WTRUs. For example, a "persistency" indication for transmission and "access service class" partitioning of the uplink common channel may be used.

Equation 8 is one possible equation for use with this common channel, for calculating the PtM transmission power, PtM_TxPwr.

$$\text{PtM\_TxPwr} = \text{DL\_PtM\_Pwr} * a * (\text{Target } RSCP/ISCP) / (\text{Measured}(RSCP/ISCP)) \quad \text{Equation 8}$$

DL_PtM_Pwr is the previous PtM transmission power setting. "a" is an operator controlling factor effecting the RSCP/ISCP ratio. Alternately, the pathloss may replace the RSCP/ISCP ratio in Equation 8.

A TPC receiver at the base station 54 receives the TPC commands, step 62. Using the received TPC commands, a transmit power calculation device adjusts the transmit power level of the base station 54. The base station's transmission power level is adjusted in accordance with the highest WTRU transmission power requirement. The TPC commands from all the WTRUs 56 in the group are processed to determine the power adjustment. Essentially, to increase the transmission power of the PtM requires only a single WTRU 56 to request an increase in transmission power. For the transmission power to decrease, all the WTRUs 56 in the group need to request a decrease in power, step 64.

In another implementation, some of the WTRUs 56 have dedicated channels for use in power control of the PtM channel and others may not. In such an implementation, power control can be performed without using the dedicated channels such as per FIGS. 3 and 4. However, preferably, WTRUs 56 having dedicated channels use those channels to generate TPC command and the WTRUs 56 not having dedicated channels use other channels, such as the PtM channel or a channel common to multiple WTRUs 56 in the group to generate the TPC commands. The base station 54 sets its transmission power level based on the commands from all the WTRUs in a particular PtM group. Essentially, to increase the transmission power of the PtM requires only a single WTRU 56 to request an increase in transmission power. For the transmission power to decrease, all the WTRUs 56 in the group need to request a decrease in power.

What is claimed is:

1. A method for transferring data in a wireless communication system, the method comprising:
    transmitting data over a particular channel from a transmitter to a plurality of receivers;
    receiving power control information from each of the receivers based on a measured reception quality and a reception quality requirements of each receiver;
    using the power control information from each receiver and adjusting a transmission power level of the particular channel so that when a single receiver out of the plurality of receivers requires an increase in the transmission power level to meet that receiver's reception quality requirement, the transmission power level is increased and when all receivers exceed their quality requirement, the transmission power of the transmitter level is decreased.

2. The method of claim 1 wherein the particular channel is a shared channel.

3. The method of claim 1 wherein the particular channel is a high speed shared channel.

4. The method of claim 1 wherein the power control information received includes transmit power control commands.

5. The method of claim 1 wherein the measured reception quality is a signal to interference ratio and the receiver quality requirement is a target signal to interference ratio.

6. The method of claim 1 wherein the measured reception quality is a reception quality of the particular channel.

7. The method of claim 1 wherein for at least one of the receivers, the particular channel has an associated dedicated channel and the measured reception quality is of the associated dedicated channel.

8. The method of claim 1 wherein for each of the receivers, the particular channel has an associated dedicated channel and the measured reception quality is of the associated dedicated channel.

9. A base station for transferring data over a particular channel to multiple users, the base station comprising:
    a transmitter and an antenna for producing a particular channel for transmission to a plurality of users simultaneously;
    a power control receiver for receiving power control information from each of the users; and
    a transmit power control device for using the power control information from each of the plurality of users and adjusting a transmission power level of an amplifier of the particular channel so that when a single user out of the plurality of users requires an increase in the transmission power level, the transmission power level is increased and when all users exceed their quality requirement, the transmission power of the transmitter level is decreased.

10. The base station of claim 9 wherein the particular channel is a shared channel.

11. The base station of claim 9 wherein the particular channel is a high speed shared channel.

12. The base station of claim 9 wherein the power control information received from each user includes transmit power control commands.

13. The base station of claim 9 wherein the base station establishes for each user a dedicated channel associated with the particular channel.

14. The base station of claim 9 wherein the base station has for at least one of the users a dedicated channel associated with the particular channel.

15. A base station for transferring data over a particular channel to multiple users, the base station comprising:
    circuitry configured to produce particular channel for transmission to a plurality of users simultaneously;
    circuitry configured to receive power control information from each of the users; and
    circuitry configured to use the power control information from each of the plurality of users and adjusting a transmission power level of an amplifier of the particular channel so that when a single user out of the plurality of users requires an increase in the transmission power level, the transmission power level is increased and when all users exceed their quality requirement, the transmission power of the transmitter level is decreased.

16. The base station of claim 15 wherein the particular channel is a shared channel.

17. The base station of claim 15 wherein the particular channel is a high speed shared channel.

18. The base station of claim 15 wherein the power control information received from each user is transmit power control commands.

19. The base station of claim 15 wherein the base station establishes for each user a dedicated channel associated with the particular channel.

20. The base station of claim 15 wherein the base station has for at least one of the users a dedicated channel associated with the particular channel.

21. A wireless transmit/receive unit for receiving data over a particular channel, the wireless transmit/receive unit comprising:

a receiver for receiving the particular channel, the particular channel being received by a plurality of wireless transmit/receive units simultaneously;

a power control information generator for sending power control information based on a measured reception quality and a reception quality requirement of the wireless transmit/receive unit; and wherein the particular channel has a transmission power level set so that when a single wireless transmit/receive unit out of the plurality of wireless transmit/receive unit requires an increase in the transmission power level to meet that reception quality requirement, the transmission power level is increased and when all of the plurality of wireless transmit/receive units sending control information exceed their quality requirement, the transmission power of the transmitter level is decreased.

22. The wireless transmit/receive unit of claim 21 wherein the measured reception quality is a signal to interference ratio and the reception quality requirement is a target signal to interference ratio.

23. The wireless transmit/receive unit of claim 21 wherein the measured reception quality is a reception quality of the particular channel.

24. The wireless transmit/receive unit of claim 21 further comprising a dedicated channel receiver and wherein the measured reception quality is of the dedicated channel.

25. A wireless transmit/receive unit for receiving data over a particular channel, the wireless transmit/receive unit comprising:

circuitry configured to receive the particular channel, the particular channel being received by a plurality of wireless transmit/receive units simultaneously;

circuitry configured to send power control information based on a measured reception quality and a reception quality requirement of the wireless transmit/receive unit; and wherein the particular channel has a transmission power level set so that when a single receiver out of the plurality of wireless transmit/receive units requires an increase in the transmission power level to meet that reception quality requirement, the transmission power level is increased and when all of the plurality of wireless transmit/receive unit sending control information exceed their quality requirement, the transmission power of the transmitter level is decreased.

26. The wireless transmit/receive unit of claim 25 wherein the measured reception quality is a signal to interference ratio and the reception quality requirement is a target signal to interference ratio.

27. The wireless transmit/receive unit of claim 25 wherein the measured reception quality is a reception quality of the particular channel.

28. The wireless transmit/receive unit of claim 25 further comprising circuitry configured to receive a dedicated channel and wherein the measured reception quality is of the dedicated channel.

* * * * *

UNITED STATES PATENT AND TRADEMARK OFFICE
CERTIFICATE OF CORRECTION

PATENT NO. : 7,400,861 B2
APPLICATION NO. : 10/632776
DATED : July 15, 2008
INVENTOR(S) : Stephen E. Terry It is certified that error appears in the above-identified patent and that said Letters Patent is hereby corrected as shown below:

IN THE SPECIFICATION

At column 1, line 45, before the words "the received", delete "then" and insert therefor --than--.

At column 2, line 1, before the words "of each", delete "ments" and insert therefor --ment--.

At column 2, line 60, after the word "physical", delete "channels are" and insert therefor --channel is--.

At column 3, delete "Equation 4" and insert therefor
--$PtM\_Power\_Ratio = RelDch*RelTF * RelQoS * X$--.

At column 4, line 10, before the words "is the set", delete "PtM_Txpwr(WTRU)" and insert therefor --PtM_TxPwr(WTRU)--.

At column 5, delete "Equation 8" and insert therefor
--$PtM\_TxPwr = DL\_PtM\_Pwr*a*(Target\ RSCP/ISCP)/(Measured(RSCP/ISCP))$--.

At column 5, line 21, after the word "factor", delete "effecting" and insert therefor --affecting--.

IN THE CLAIMS

At claim 1, column 5, line 61, before the words "of each", delete "requirements" and insert therefor --requirement--.

At claim 1, column 6, line 1, after the word "receivers", insert --sending control information--.

At claim 1, column 6, lines 2 & 3, after the word "power", delete "of the transmitter level" and insert therefor --level of the transmitter--.

At claim 9, column 6, line 36, after the word "users", insert --sending control information--.

UNITED STATES PATENT AND TRADEMARK OFFICE
CERTIFICATE OF CORRECTION

PATENT NO.      : 7,400,861 B2
APPLICATION NO. : 10/632776
DATED           : July 15, 2008
INVENTOR(S)     : Stephen E. Terry It is certified that error appears in the above-identified patent and that said Letters Patent is hereby corrected as shown below:

At claim 9, column 6, lines 37 & 38, after the word "power", delete "of the transmitter level" and insert therefor --level of the transmitter--.

At claim 15, column 6, line 54, after the word "produce", insert --a--.

At claim 15, column 6, line 64, after the word "users", insert --sending control information--.

At claim 18, column 7, line 4, after the word "user", delete "is" and insert therefor --includes--.

At claim 21, column 7, line 24, after the words "transmit/receive", delete "unit" and insert therefor --units--.

At claim 21, column 7, line 30, after the word "power", delete "of the transmitter level" and insert therefor --level of the transmitter--.

At claim 25, column 8, line 21, before the word "sending", delete "unit" and insert therefor --units--.

Signed and Sealed this

Ninth Day of June, 2009

JOHN DOLL
*Acting Director of the United States Patent and Trademark Office*